(12) United States Patent
Ichimura

(10) Patent No.: US 12,546,712 B2
(45) Date of Patent: *Feb. 10, 2026

(54) APPARATUS AND METHOD FOR MEASURING CONCENTRATION OF GAS IN MEASUREMENT TARGET

(71) Applicant: Asahi Kasei Microdevices Corporation, Tokyo (JP)

(72) Inventor: Kakeru Ichimura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 18/184,641

(22) Filed: Mar. 15, 2023

(65) Prior Publication Data

US 2023/0296505 A1  Sep. 21, 2023

(30) Foreign Application Priority Data

Mar. 17, 2022 (JP) .................................. 2022-042852
Mar. 9, 2023 (JP) .................................. 2023-036218

(51) Int. Cl.
*G01N 21/3504* (2014.01)

(52) U.S. Cl.
CPC ... *G01N 21/3504* (2013.01); *G01N 2201/127* (2013.01)

(58) Field of Classification Search
CPC ......... G01N 21/3504; G01N 2201/127; G01N 21/274; G01N 2201/1211
See application file for complete search history.

(56) References Cited

U.S. PATENT DOCUMENTS

| 5,068,798 A | * | 11/1991 | Heath | ...................... | G01N 1/26 |
| | | | | | 250/343 |
| 5,332,901 A | | 7/1994 | Eckles | | |
| 5,452,234 A | * | 9/1995 | Heath | ...................... | G01N 1/26 |
| | | | | | 700/282 |
| 5,608,212 A | | 3/1997 | Timo | | |

(Continued)

FOREIGN PATENT DOCUMENTS

| EP | 2657682 A1 | 10/2013 |
| JP | S61223633 A | 10/1986 |

(Continued)

*Primary Examiner* — Edwin C Gunberg
*Assistant Examiner* — Richard O Toohey

(57) ABSTRACT

There is provided an apparatus including a measuring unit including a light-emitting unit and a first sensor for measuring a first measurement value of a first physical quantity that varies in response to light emitted from the light-emitting unit passing through a measurement target; a second sensor for measuring a second measurement value of a second physical quantity having a correlation with a standard value of the first measurement value, among physical quantities relating to the measuring unit; a third sensor for measuring a third measurement value of a third physical quantity having a correlation with the standard value; a detection unit for detecting presence or absence or a concentration of the gas to be detected in the measurement target, based on the first measurement value; and a determination unit for determining whether a deterioration amount of accuracy of the first measurement value has exceeded a threshold.

15 Claims, 6 Drawing Sheets

(56) References Cited

U.S. PATENT DOCUMENTS

| | | | |
|---|---|---|---|
| 7,071,470 B2 | 7/2006 | Nomura | |
| 8,592,769 B2 | 11/2013 | Kusukame | |
| 9,259,176 B2 | 2/2016 | Suzuki | |
| 9,310,295 B2 | 4/2016 | Tabaru | |
| 9,464,983 B2 | 10/2016 | Amano | |
| 10,241,038 B2 | 3/2019 | Nishimura | |
| 10,677,721 B2 | 6/2020 | Goda | |
| 11,131,625 B2 | 9/2021 | Avetisov | |
| 11,360,020 B2 | 6/2022 | Takahashi | |
| 11,686,671 B2 | 6/2023 | Nagase | |
| 11,709,130 B2 | 7/2023 | Camargo | |
| 2006/0173637 A1 | 8/2006 | Martin | |
| 2006/0273896 A1 | 12/2006 | Kates | |
| 2007/0063833 A1 | 3/2007 | Kates | |
| 2008/0030159 A1 | 2/2008 | Hiramoto | |
| 2011/0248857 A1* | 10/2011 | Rutherford | H04Q 9/00 340/632 |
| 2011/0261359 A1 | 10/2011 | Inada | |
| 2012/0287418 A1* | 11/2012 | Scherer | G01N 21/39 356/51 |
| 2012/0312988 A1 | 12/2012 | Mataga | |
| 2014/0052003 A1* | 2/2014 | Jiang | G01N 21/3504 600/475 |
| 2014/0067282 A1 | 3/2014 | Beyer | |
| 2016/0231239 A1* | 8/2016 | Kotidis | H01S 5/3401 |
| 2019/0094134 A1* | 3/2019 | Solovyov | G01N 21/314 |
| 2019/0212261 A1* | 7/2019 | Lannestedt | G01J 3/0208 |

FOREIGN PATENT DOCUMENTS

| | | |
|---|---|---|
| JP | H11304706 A | 11/1999 |
| JP | 2001221738 A | 8/2001 |
| JP | 2001235419 A | 8/2001 |
| JP | 2004309391 A | 11/2004 |
| JP | 2005315587 A | 11/2005 |
| JP | 2006153857 A | 6/2006 |
| JP | 2007003160 A | 1/2007 |
| JP | 2007102014 A | 4/2007 |
| JP | 2012073098 A | 4/2012 |
| JP | 2014074629 A | 4/2014 |
| JP | 2017015516 A | 1/2017 |
| WO | 2015119127 A1 | 8/2015 |

* cited by examiner

APPARATUS AND METHOD FOR MEASURING CONCENTRATION OF GAS IN MEASUREMENT TARGET

APPARATUS AND METHOD

The contents of the following Japanese patent application (s) are incorporated herein by reference:
2022-042852 filed in JP on Mar. 17, 2022
2023-036218 filed in JP on Mar. 9, 2023

BACKGROUND

1. Technical Field

The present invention relates to an apparatus and a method.

2. Related Art

Patent Document 1 describes "providing a gas sensor configured to correct an influence of deterioration of a light source with high accuracy".

PRIOR ART DOCUMENT

Patent Document

Patent Document 1: Japanese Patent Application Publication No. 2017-015516
Patent Document 2: Japanese Patent Application Publication No. 2007-502407

DESCRIPTION OF EXEMPLARY EMBODIMENTS

Hereinafter, an embodiment of the present invention will be described, but the embodiment does not limit the invention according to the claims. In addition, not all of the combinations of features described in the embodiments are essential for a solving means of the invention.

Figure 1:
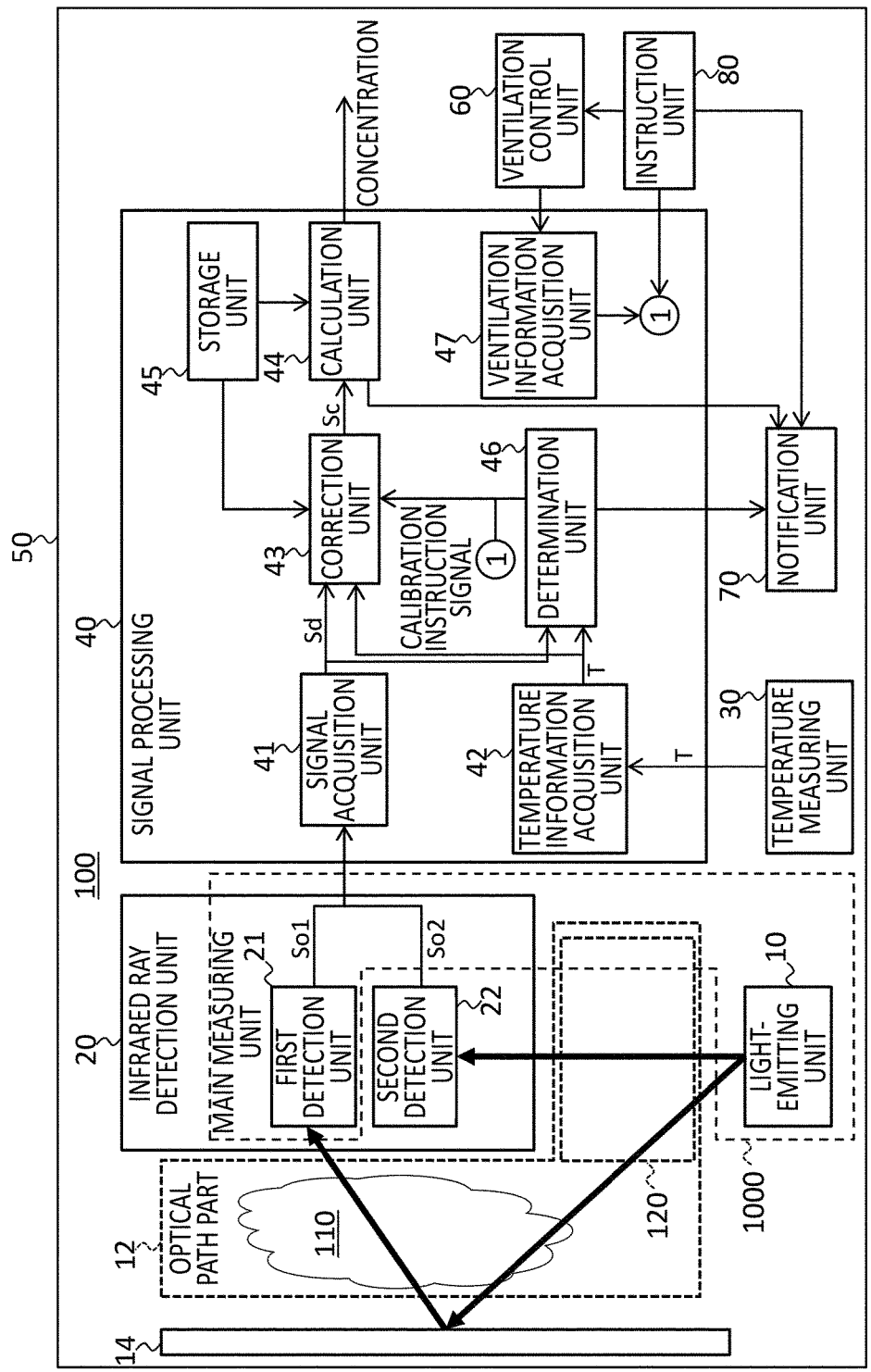
FIG. 1 illustrates an example of a configuration of a concentration measurement apparatus 100.

FIG. 1 illustrates an example of a configuration of a concentration measurement apparatus 100. The concentration measurement apparatus 100 includes a ventilation control unit 60, a light-emitting unit 10, an infrared ray detection unit 20, a temperature measuring unit 30, a signal processing unit 40, a notification unit 70, and an instruction unit 80. In the present example, the concentration measurement apparatus 100 includes an optical path part 12, and a reflecting part 14. The concentration measurement apparatus 100 is configured to measure a concentration of gas to be detected included in a measurement target 110 by using an infrared ray.

The measurement target 110 is a target material for which a concentration of gas to be detected is measured. The measurement target 110 may be gas or liquid. The gas to be detected is carbon dioxide gas, but is not limited thereto. When the measurement target 110 is liquid, the gas to be detected may also be gas dissolved in the liquid.

The ventilation control unit 60 is configured to cause a ventilator (not shown) to perform ventilation of the gas of the measurement target 110. The ventilator may be configured to ventilate an installation space in which the concentration measurement apparatus 100 is provided, or may be configured to ventilate only the measurement target 110 in the optical path part 12. As an example, the ventilator may be an air conditioner or a ventilation fan. The ventilator may also be another apparatus that can cause gas including only a standard concentration (for example, a concentration in the air) of the gas to be detected to flow into the installation space of the concentration measurement apparatus 100 or into the optical path part 12.

The ventilation control unit 60 may be configured to perform ventilation, in response to a user operation. The ventilation control unit 60 or the ventilator may be configured to supply ventilation information, which represents that the gas of the measurement target 110 has been ventilated, to the signal processing unit 40. For example, the ventilation control unit 60 or the ventilator may be configured to output the ventilation information, in response to the end of ventilation.

The light-emitting unit 10 is configured to emit an infrared ray for measuring a concentration of the gas to be detected. The light-emitting unit 10 may be configured to emit an infrared ray having a certain light quantity, in order to cause the infrared ray to pass through the measurement target 110 and to calculate a concentration of the gas to be detected. The light-emitting unit 10 may also be provided outside the concentration measurement apparatus 100.

The optical path part 12 is an optical path for causing the infrared ray to pass through the measurement target 110. The optical path part 12 includes the measurement target 110 and causes the infrared ray to pass through the measurement target 110 at a predetermined optical path length. The optical path part 12 may be a container for holding the measurement target 110 in a closed space, or may be a flow path for causing the measurement target 110 to flow. The measurement target 110 in the optical path part 12 may be in communication with the outside air. The infrared ray reflected by the reflecting part 14 may pass through the optical path part 12. The optical path part 12 may have a light transmission region 120 that does not include the measurement target 110. The transmittance of the light transmission region 120 may be a standard transmittance that does not fluctuate depending on a gas concentration in the measurement target 110. The light transmission region 120 may include a closed space isolated from the measurement target 110 or may include a light-transmitting member such as glass.

The infrared ray detection unit 20 is configured to detect the infrared ray emitted by the light-emitting unit 10 and to output a detection signal Sd. The infrared ray detection unit 20 of the present example includes a first detection unit 21 and a second detection unit 22. The first detection unit 21 and the second detection unit 22 each have an infrared ray sensor for detecting the infrared ray emitted by the light-emitting unit 10. The infrared ray detection unit 20 may have a quantum well type sensor for detecting the infrared ray. The first detection unit 21 and the second detection unit 22 may each be a quantum well type sensor.

The first detection unit 21 is an example of the first sensor, and is configured to measure a first measurement value of a first physical quantity (in the present embodiment, the intensity of the infrared ray, as an example) that varies in response to the infrared ray from the light-emitting unit 10 passing through the measurement target 110. The first detection unit 21 is configured to detect the intensity of the infrared ray having passed through the measurement target 110, as the first measurement value, and to output a first output signal So1 representing the detected first measurement value to the signal processing unit 40. After being emitted from the light-emitting unit 10, the infrared ray incident on the first detection unit 21 may pass through the light transmission region 120 that does not include the measurement target, or may not pass through the light transmission region 120.

A light quantity of the infrared ray incident on the first detection unit 21 varies according to the concentration of the gas to be detected included in the measurement target 110, and the like. For example, the light quantity of the infrared ray incident on the first detection unit 21 varies according to the Lambert-Beer law. The first detection unit 21 of the present example is configured to detect the infrared ray reflected by the reflecting part 14. That is, the first detection unit 21 is configured to detect the infrared ray caused to pass through the measurement target 110, reflected by the reflecting part 14, and caused to pass through the measurement target 110 again. However, the first detection unit 21 may be configured to detect the infrared ray emitted by the light-emitting unit 10 without causing it to be reflected by the reflecting part 14.

The measurement accuracy of the first measurement value may deteriorate due to variation in the use environment of the concentration measurement apparatus 100, variation in a state of the concentration measurement apparatus 100 (as an example, aging deterioration or fluctuation in performance of the first detection unit 21), or the like. For this reason, the first measurement value is adapted to be appropriately corrected by a correction unit 43 in the signal processing unit 40, which will be described later.

The first detection unit 21 and the light-emitting unit 10 may constitute a measuring unit 1000 (also referred to as a main measuring unit or a main measurement apparatus) configured to mainly measure a concentration of gas to be detected included in a measurement target. Note that the main measuring unit 1000 may also include other components such as the optical path part 12.

The second detection unit 22 is an example of the second sensor, and is configured to measure, among physical quantities relating to the main measuring unit 1000, a second measurement value of a second physical quantity independent of the concentration of the gas to be detected included in the measurement target 110 and having a correlation with a standard value SV of the first measurement value. The physical quantity relating to the main measuring unit 1000 may be a physical quantity (as an example, a resistance value or a supply voltage) that is measured for an element (as an example, a light-emitting element or an element in a sensor part) included in the main measuring unit 1000, may be a same kind of a physical quantity that is measured in order to decide a standard value of the physical quantity to be measured by the main measuring unit 1000, or may be a physical quantity that is measured for an element configured to measure the same kind of physical quantity. The standard value SV may be a value that is used for correction of the first measurement value in a correction unit 43 described later.

In the present embodiment, as an example, the second detection unit 22 is configured to measure the intensity of the infrared ray emitted from the light-emitting unit 10 and having passed through the light transmission region 120 of a standard transmittance. The second detection unit 22 is configured to detect the intensity of the infrared ray not having passed through the measurement target 110, as the second measurement value, and to output a second output signal So2 representing the detected second measurement value to the signal processing unit 40. The second detection unit 22 is configured to detect a certain light quantity of the infrared ray without being affected by the concentration of the measurement target 110. The second detection unit 22 may be configured to detect the infrared ray emitted by the light-emitting unit 10 without causing it to be reflected by the reflecting part 14.

The detection signal Sd is a signal based on the first output signal So1 and the second output signal So2. The detection signal Sd may include each of the first output signal So1 and the second output signal So2. The detection signal Sd may include a signal ratio of the first output signal So1 and the second output signal So2. A variation in the concentration of the gas to be detected included in the measurement target 110 can be detected by comparing the first output signal So1 and the second output signal So2 output from the infrared ray detection unit 20.

The infrared ray sensor of the infrared ray detection unit 20 may be a pyroelectric sensor or a quantum well type sensor. At least one of the first detection unit 21 or the second detection unit 22 may be a quantum well type sensor. The infrared ray detection unit 20 can achieve a faster response by using a quantum well type sensor, as compared with a pyroelectric sensor. In addition, since the quantum well type sensor can measure a signal absolute value, simple signal processing can be achieved.

Note that the light-emitting unit 10 may be configured to cause the optical path to diverge after emitting an infrared ray from a common single light-emitting element, thereby causing the infrared rays on different optical paths to be detected with the first detection unit 21 and the second detection unit 22. In addition, the light-emitting unit 10 may be configured to emit a plurality of infrared rays from different light emitting elements, thereby causing the infrared rays on different optical paths to be detected with the first detection unit 21 and the second detection unit 22.

The temperature measuring unit 30 is an example of the third sensor, and is configured to measure a third measurement value of a third physical quantity independent of the concentration of the gas to be detected included in the measurement target 110 and having a correlation with the standard value SV of the first measurement value. The third measurement value may have a correlation with the second measurement value. In the present embodiment, as an example, the temperature measuring unit 30 is configured to measure a temperature of the measurement target 110 or the concentration measurement apparatus 100. The temperature measuring unit 30 may be configured to supply a measurement temperature T representing the measured third measurement value to the signal processing unit 40.

The temperature measuring unit 30 may be configured to measure a temperature at an arbitrary position of the concentration measurement apparatus 100 by using an arbitrary temperature sensor. For example, the temperature measuring unit 30 is configured to measure a temperature of the light-emitting unit 10, the infrared ray detection unit 20, or the signal processing unit 40.

In an example, the temperature measuring unit 30 is configured to measure the temperature of the infrared ray detection unit 20 by using the second detection unit 22. The temperature measuring unit 30 may be configured to measure a temperature of the second detection unit 22, based on the second output signal Sot. Specifically, the temperature measuring unit 30 may be configured to measure the temperature of the second detection unit 22, based on an infrared ray signal value of the second detection unit 22. Specifically, the temperature measuring unit 30 may be configured to measure the temperature of the second detection unit 22, based on a resistance value of the second detection unit 22. When a temperature dependency of the second output signal Sot is measured in advance, the second output signal Sot can be utilized as a thermometer. Note that the temperature dependency of the second output signal Sot may be stored in a storage unit 45 described below.

Here, temperature characteristics that affect concentration calculation may occur in the light-emitting unit 10 or the infrared ray detection unit 20. In addition, a light absorption characteristic of the measurement target 110 also varies depending on the temperature, so that the concentration calculation may be affected. For this reason, when correction is performed based on these temperatures, it is easier for the concentration measurement apparatus 100 to calculate the concentration of the measurement target 110 with higher accuracy.

The signal processing unit 40 includes a signal acquisition unit 41, a temperature information acquisition unit 42, a correction unit 43, a calculation unit 44, a storage unit 45, a determination unit 46, and a ventilation information acquisition unit 47. The signal processing unit 40 may be constituted by a microcomputer.

The signal acquisition unit 41 is configured to acquire the detection signal Sd from the infrared ray detection unit 20. The signal acquisition unit 41 is configured to input the detection signal Sd to the correction unit 43 and the determination unit 46. The signal acquisition unit 41 may be configured to acquire the detection signal Sd from the infrared ray detection unit 20 provided outside the concentration measurement apparatus 100. The signal acquisition unit 41 may be configured to acquire each of the first output signal So1 and the second output signal So2, as the detection signal Sd, or may be configured to acquire a signal ratio of the first output signal So1 and the second output signal So2. The signal acquisition unit 41 may be configured to acquire each of the first output signal So1 and the second output signal So2 to generate the signal ratio of the first output signal So1 and the second output signal So2.

The temperature information acquisition unit 42 is configured to acquire the measurement temperature T measured by the temperature measuring unit 30. The measurement temperature T may be the temperature of the measurement target 110. The measurement temperature T may be the temperature of the light-emitting unit 10, the infrared ray detection unit 20, or the signal processing unit 40. The temperature information acquisition unit 42 may be configured to acquire the measurement temperature T from the temperature measuring unit 30 provided outside the concentration measurement apparatus 100. The temperature information acquisition unit 42 is configured to input the acquired measurement temperature T to the correction unit 43 and the determination unit 46.

The correction unit 43 is configured to output a correction signal Sc obtained by correcting the detection signal Sd. In the present embodiment, as an example, the correction unit 43 is configured to generate the correction signal Sc obtained by correcting (for example, zero correction, span correction) the detection signal Sd based on the detection signal Sd and the measurement temperature T. As an example, the correction unit 43 may be configured to perform zero correction on the detection signal Sd by adding and subtracting or multiplying and dividing a value (for example, a correction coefficient Zero(T) described later) based on the measurement temperature T.

The correction unit 43 may be configured to correct (for example, deterioration correction) the first output signal So1 by using the standard value SV. For example, the correction unit 43 is configured to correct the first output signal So1 so that the first output signal So1 matches the standard value SV when the gas to be detected is not included in the measurement target 110 at a concentration equal to or higher than an atmospheric concentration. For example, the correction unit 43 may be configured to perform deterioration correction on the first output signal So1 by adding and subtracting or multiplying and dividing a shift amount Δ described later with respect to the first output signal So1.

The standard value SV is, as an example, may be a predetermined value calculated using a function So1/So2× Zero(T) with the first output signal So1 that is output from the first detection unit 21 when the measurement target 110 does not contain the gas to be detected at a concentration higher than the atmospheric concentration, a correction coefficient Zero(T) decided according to the measurement temperature T by the temperature measuring unit 30, and the second output signal So2 output from the second detection unit 22. A value of such standard value SV may be set upon factory shipment or the like of the concentration measurement apparatus 100. The correction coefficient Zero(T) may be a value that fluctuates depending on the temperature.

Instead of this, the standard value SV may be a predetermined value of the first output signal So1 that is output from the first detection unit 21 when the measurement target 110 does not contain gas to be detected at a concentration higher than the atmospheric concentration. A value of such standard value SV may be set upon factory shipment or the like of the concentration measurement apparatus 100. The measurement target 110 that does not contain the gas to be detected at a concentration higher than the atmospheric concentration may be the measurement target 110 that does not contain the gas to be detected, or may be the measurement target 110 immediately after ventilation. When the gas to be detected is carbon dioxide, the atmospheric concentration may be 400 ppm.

The correction unit 43 may be an example of the calibration unit, and may be configured to perform calibration of the first measurement value measured by the first detection unit 21. The correction unit 43 may be configured to perform calibration of the first output signal So1 representing the first measurement value, as the calibration of the first measurement value. The calibration of the first output signal So1 may be to decide a shift amount Δ between the predetermined standard value SV of the first output signal So1 and a standard value SV' to be used in a current situation. The correction unit 43 may be configured to perform calibration of the first output signal So1 based on the standard value of the first output signal So1, and in the present embodiment, may be configured to decide, from the standard value SV and the standard value SV', as an example, the shift amount Δ therebetween. The standard value SV' may vary according to variation in the use environment of the concentration measurement apparatus 100, variation in the state of the concentration measurement apparatus 100 (as an example, aging deterioration or fluctuation in performance of the first detection unit 21), and the like.

The correction unit 43 may be configured to perform calibration by using the measurement results by the first detection unit 21, the second detection unit 22 and the temperature measuring unit 30. In the present embodiment, as an example, the correction unit 43 is configured to acquire the first output signal So1, the second output signal Sot and the measurement temperature T, to calculate the standard value SV' by SV'=So1/So2×Zero(T), and to decide the shift amount Δ.

Instead of this, the correction unit 43 may be configured to perform calibration by using a measurement result by the first detection unit 21 when the measurement target 110 does not contain the gas to be detected at a concentration higher than the atmospheric concentration. In this case, the correction unit 43 is configured to decide the shift amount Δ by using, as the standard value SV', the value of the first output signal So1 that is output from the first detection unit 21 when the measurement target 110 does not contain the gas to be detected at a concentration higher than the atmospheric concentration. The correction unit 43 may be configured to use a measurement result immediately after ventilation, or a measurement result at a time when a concentration of the gas to be detected after previous calibration becomes the lowest, as the measurement result, i.e., the standard value SV' by the first detection unit 21 when the measurement target 110 does not contain the gas to be detected at a concentration higher than the atmospheric concentration. When using, as the standard value SV', the measurement result at a time when a concentration of the gas to be detected becomes the lowest, the correction unit 43 may be configured to specify the standard value SV' by using a plurality of measurement results by the first detection unit 21, and as an example, may be configured to specify, as the standard value SV', the measurement result at a time when a concentration of the gas to be detected becomes the lowest, among the plurality of measurement results.

The correction unit 43 may be configured to perform calibration, in response to receiving a signal instructing execution of calibration (also referred to as a calibration instruction signal) from the ventilation information acquisition unit 47, the determination unit 46, the instruction unit 80, etc. described later. The correction unit 43 may be configured to perform deterioration correction of the first output signal So1 by using the shift amount Δ after calibration, when calibration has been performed.

The correction unit 43 is configured to output a correction signal Sc corresponding to the first output signal So1 after correction. The correction unit 43 may be configured to supply the correction signal Sc to the calculation unit 44. In addition, the correction unit 43 may be configured, in response to calibration of the first measurement value being performed, to supply a signal representing the effect to the calculation unit 44.

The calculation unit 44 is an example of the detection unit, and is configured to detect the concentration of the gas to be detected included in the measurement target 110, based on the first measurement value (in the present embodiment, the first output signal So1, as an example). The calculation unit 44 may be configured to detect the concentration of the gas to be detected from the correction signal Sc. For example, the calculation unit 44 is configured to calculate the concentration of the gas to be detected corresponding to the correction signal Sc by using predetermined calibration curve data for calculating the concentration of the gas to be detected. For example, the calculation unit 44 is configured to correct and apply the detection signal Sd at any measurement temperature Tm to the calibration curve data, thereby calculating the concentration of the gas to be detected by using common calibration curve data at a standard temperature (25° C.). For this reason, there is no need to change the calibration curve data according to the measurement temperature T. The calibration curve data will be described later. The calculation unit 44 may be an example of the output unit, and may be configured to output a detection result of the concentration of the gas to be detected to an outside of the concentration measurement apparatus 100. In addition, the calculation unit 44 may be configured to count the elapsed time since the calibration in the correction unit 43 is performed.

The storage unit 45 is configured to store information required to calculate the concentration of the measurement target 110. The storage unit 45 of the present example is configured to store information such as a correction parameter that is used for correction of the detection signal Sd in the correction unit 43. The storage unit 45 may be configured to store the calibration curve data for calculating the concentration of the gas to be detected by the calculation unit 44.

The determination unit 46 is configured to determine whether a deterioration amount E of accuracy of the first measurement value (in the present embodiment, the first output signal So1, as an example) has exceeded a threshold by using the second measurement value (in the present embodiment, the second output signal Sot, as an example) and the third measurement value (in the present embodiment, the measurement temperature T, as an example). For example, the determination unit 46 is configured to calculate, as the deterioration amount E of accuracy of the first measurement value, a value of a function defined by the second measurement value and the third measurement value, the value of the function becoming a predetermined value when the accuracy of the first measurement value has not deteriorated. The threshold may be arbitrarily set. The determination unit 46 may be configured to supply a calibration instruction signal to the correction unit 43, in response to the deterioration amount E having exceeded the threshold. In this way, the calibration of the first measurement value is performed, in response to the deterioration amount E having exceeded the threshold. In response to the deterioration amount E having exceeded the threshold, the determination unit 46 may be configured to further supply a signal representing the effect to the notification unit 70.

Note that the threshold for determination may be a fixed value or a variable value. For example, the threshold for determination may be increased or decreased each time the calibration of the first measurement value is performed. As an example, when calibration is performed in response to the deterioration amount E having exceeded the threshold V, the threshold V may be updated to a value of V+E or V×E.

Here, the deterioration amount is described. When calibration of the first measurement value is performed as described above in the correction unit 43, a following relational expression (1) is established for a concentration serving as a standard for calibration (for example, a concentration equal to or lower than the atmospheric concentration) between the first output signal $So1_{(before\ deterioration)}$ and the second output signal $So2_{(before\ deterioration)}$ immediately after calibration.

$$So1_{(before\ deterioration)} = So2_{(before\ deterioration)} / \text{Zero}(T) \quad (1)$$

On the other hand, assuming that, in a case in which the measurement accuracy of the first measurement value deteriorates, the second measurement value also exhibits substantially similar deterioration characteristics, the first output signal $So1_{(after\ deterioration)}$ and the second output signal $So2_{(after\ deterioration)}$ after deterioration are represented by following expressions (2) and (3). Note that "A" in the expression is a coefficient corresponding to a degree of deterioration progression, and "δ" represents a coefficient corresponding to a difference in the degree of deterioration progression between the first measurement value and the second measurement value.

$$So1_{(after\ deterioration)} = So1_{(before\ deterioration)} \times A \qquad (2)$$

$$So2_{(after\ deterioration)}/\text{Zero}(T) = So2_{(before\ deterioration)}/\text{Zero}(T) \times (A + \delta A) \qquad (3)$$

From these expressions (2) and (3), it can be seen that, when the measurement accuracy of the first measurement value deteriorates at a concentration serving as the standard for calibration, a value based on $So2_{(before\ deterioration)}/\text{Zero}(T) \times \delta A$ appears as a measurement error of a concentration of the gas to be detected.

When acquiring the deterioration amount E, a function G(So2, T) that fluctuates depending on the second output signal value Sot and the measurement temperature T, i.e., a function G(So2, T) of which the value becomes a predetermined value (in the present embodiment, "1", as an example) when the accuracy of the first output signal So1 has not deteriorated may be acquired in advance. The function G(So2, T) is represented by a following expression (4), as an example. Note that f(T) in the expression is a function that fluctuates depending on the measurement temperature T.

$$G(So2, T) = So2_{(after\ deterioration)}/f(T) \qquad (4)$$

A value of the function G(So2, T) can represent (A+δA) in the expression (3). Therefore, in the present embodiment, as an example, the value of the function G(So2, T) is used as the deterioration amount E.

The ventilation information acquisition unit 47 is configured to acquire ventilation information representing that the gas of the measurement target 110 has been ventilated. For example, the ventilation information acquisition unit 47 is configured to acquire the ventilation information from the ventilator or the ventilation control unit 60. However, the ventilation information acquisition unit 47 may also be configured to acquire the ventilation information from a user operation on an instruction unit 80 described later. The ventilation information acquisition unit 47 may be configured to supply a calibration instruction signal to the correction unit 43, in response to the ventilation information being acquired. Thereby, calibration of the first output signal So1 is performed by the correction unit 43, in response to the ventilation information being acquired.

The notification unit 70 is configured to notify a variety of information to a user. For example, the notification unit 70 may be an example of the first notification unit, and may be configured to perform notification to the user, in response to the deterioration amount E having exceeded the threshold and a signal to that effect being supplied from the determination unit 46. Thereby, the notification to the user is performed, in response to the deterioration amount E having exceeded the threshold.

The notification unit 70 may be configured to perform notification by displaying a notification message, by outputting a voice message, or by lighting an indicator. As an example, the notification unit 70 may be configured to cause a notification message to be displayed by communicating with a display device outside the concentration measurement apparatus 100 in a wireless or wired manner. The display device may be a remote controller of the ventilator or a user terminal such as a smart phone or a PC.

The instruction unit 80 is configured to receive various operation inputs from the user and to supply signals corresponding to the input operation contents to each unit of the concentration measurement apparatus 100. For example, the instruction unit 80 may be configured to supply a ventilation instruction signal to the ventilation control unit 60, in response to a ventilation instruction operation being input.

In addition, the instruction unit 80 may be configured to supply a calibration instruction signal to the correction unit 43, in response to a calibration instruction operation being input. Thereby, calibration is performed by the correction unit 43, in response to receiving the calibration instruction operation from the user. Note that the calibration instruction operation may be input, in response to being notified by the notification unit 70 that the deterioration amount E has exceeded the threshold, or may be input, in response to the measurement target 110 being ventilated.

The concentration measurement apparatus 100 is accommodated in one casing 50. That is, the concentration measurement apparatus 100 is put into a single package by the casing 50. In the present example, the concentration measurement apparatus 100 is put into a single package, including the light-emitting unit 10, the optical path part 12, the reflecting part 14, the infrared ray detection unit 20, and the temperature measuring unit 30 as well as the signal processing unit 40. However, any configuration may be provided outside the casing 50. That is, the concentration measurement apparatus 100 may be configured to acquire the detection signal Sd and the measurement temperature T measured outside the casing 50 to calculate the concentration of the gas to be detected.

Here, absorption of the infrared ray by the measurement target 110 will be described using the Lambert-Beer law. In the present example, a description will be provided by using gas as the measurement target 110. However, the present invention is not limited thereto. A light absorption quantity Abs of the infrared ray by gas is represented by a following expression.

$$\text{Abs} = I_0 - I_0 \times e^{-k \times l \times c}$$

$I_0$ represents an ideal arrival light quantity without the influence of gas. In addition, k denotes an absorption coefficient depending on gas, l denotes an optical path length, and c denotes a gas concentration. An absorbance AR is represented by a following expression.

$$AR = 1 - e^{-k \times l \times c}$$

When correction parameters of zero correction and span correction are given with a temperature coefficient, each correction parameter is represented by a following expression. Note that the zero correction and the span correction will be described later.

correction parameter $\text{Zero}(T) = \text{Zero} \times fz(T)$ correction parameter $\text{Span}(T) = \text{Span} \times fs(T)$ In this case, a light absorption signal Signal_Abs is represented by a following expression.

$$\text{Signal\_Abs} = (1 - (So1/So2) \times \text{Zero}(T)) \times \text{Span}(T)$$

For example, when the correction parameter is decided such that the absorption signal Signal_Abs becomes 0 at a concentration of 0 ppm serving as a standard concentration for zero correction, a following relational expression (1') is established. The relational expression (1) described above may be derived from the relational expression (1').

$$So1=So2/\text{Zero}(T) \qquad (1')$$

An arrival light quantity is represented by a following expression.

$$I_0-\text{Abs}=I0-(I_0-I_0 \times e^{-k \times l \times c})$$

Then, an arrival light quantity signal Signal is represented by the following expression.

$$\text{Signal}=1-(1-So1/So2)\times\text{Zero}(T))\times\text{Span}(T)$$

In this way, the concentration measurement apparatus 100 can calculate the concentration of the gas to be detected in the measurement target 110 by acquiring a signal corresponding to the concentration of the gas to be detected in the measurement target 110.

According to the concentration measurement apparatus 100 described above, since the infrared ray is emitted from the light-emitting unit 10 and the intensity of the infrared ray having passed through the measurement target 110 is measured by the first detection unit 21, the concentration of the gas to be detected can be detected by a so-called NDIR method. In addition, since the detection result is output from the calculation unit 44, the concentration of the gas to be detected can be notified to the user.

In addition, the presence or absence of the deterioration in accuracy of the first output signal So1 is determined using the second measurement value (in the present embodiment, the second output signal Sot, as an example) having a correlation with the standard value SV of the first measurement value (in the present embodiment, the first output signal So1, as an example) and the third measurement value (in the present embodiment, the measurement temperature T, as an example) having a correlation with the standard value SV, among the physical quantities relating to the main measuring unit 1000. Therefore, it is possible to detect variation in the use environment of the concentration measurement apparatus 100 and variation in the state of the concentration measurement apparatus 100 (as an example, aging deterioration or fluctuation in performance of the first detection unit 21), which affect the measurement accuracy of the first measurement value. In addition, a decrease in accuracy of the first output signal So1 due to a shift of the standard value SV, and further, a decrease in measurement accuracy of the concentration of the gas to be detected can be detected regardless of the concentration of the gas to be detected in the current measurement target 110. Therefore, by performing calibration of the first output signal So1, in response to the detection of the decrease in accuracy of the first output signal So1, the measurement accuracy of the concentration of the gas to be detected can be maintained high. Further, by waiting for calibration until the decrease in accuracy of the first output signal So1 is detected, unnecessary calibration can be prevented from being performed. Therefore, it is possible to reduce power consumption by reducing computation processing for calibration, and to improve the operating efficiency of the concentration measurement apparatus 100.

In addition, as a function defined by the second output signal So2 and the measurement temperature T, the value of the function G(So2, T), which becomes 1 when the accuracy of the first output signal So1 is not deteriorated, is calculated as the deterioration amount E in accuracy. Therefore, since the deterioration amount E can be evaluated according to how far the function value being from 1, the presence or absence of deterioration can be easily determined.

Further, since the calibration of the first output signal So1 is performed using the measurement results by the second detection unit 22 and the temperature measuring unit 30, it is possible to calibrate the first output signal So1, i.e., to decide the shift amount Δ between the standard value SV of the first output signal So1 and the standard value SV' to be used in the current situation by using the sensor that is used for determination of the deterioration in accuracy of the first output signal So1 or for zero correction of the first output signal So1. Therefore, since it is not necessary to separately provide a sensor used for determination of the deterioration in accuracy or for zero correction of the first output signal So1 and a sensor used for calibration of the first output signal So1, it is possible to prevent the concentration measurement apparatus 100 from being enlarged. In addition, since the standard value is specified using the plurality of first output signals So1 by the first detection unit 21 and the calibration of the first output signals So1 is performed based on the standard value, the calibration can be performed accurately based on the more appropriate standard value. Further, when calculating the deterioration amount E, the second output signal So2 and the measurement temperature T are used, and when calculating the standard value SV of the first output signal So1, the first output signal So1 is used. Therefore, the calculation of the standard value SV of the first output signal So1 and the calculation of the deterioration amount E can be performed by the independent calculations. Further, the calibration is performed by specifying the standard value SV for calibration from the first output signal So1 itself, which is a calibration target. Therefore, as compared with a case in which the calibration is performed using the deterioration amount E, the calibration can be performed accurately based on the more appropriate standard value SV.

Further, since the calibration of the first output signal So1 is performed, in response to the deterioration amount E having exceeded the threshold, the accuracy of the first output signal So1, and further, the measurement accuracy of the concentration of the gas to be detected can be maintained high.

Further, since the calibration is performed in response to receiving a calibration instruction operation from the user, the calibration can be performed at a timing desired by the user. Therefore, it is possible to cause calibration to be performed when the effect that the deterioration amount E has exceeded the threshold has been notified or when ventilation has been performed, for example.

Further, since the calibration is performed in response to acquisition of the ventilation information representing that the measurement target 110 has been ventilated, the calibration can be performed using the measurement result by the first detection unit 21 in the case where the measurement target 110 does not contain the gas to be detected at a concentration higher than the atmospheric concentration. Therefore, unlike the case where the calibration is performed using the measurement result by the first detection unit 21 in the case where the measurement target 110 contains the gas to be detected at a concentration equal to or higher than the atmospheric concentration or the concentration of the gas to be detected is unclear, accurate calibration can be performed.

Further, since the ventilation information is acquired from either the ventilator configured to perform ventilation of the gas of the measurement target 110 or the ventilation control unit 60 configured to cause the ventilator to perform ventilation, the calibration can be performed with accurately detecting the ventilation timing. Therefore, accurate calibration can be performed reliably.

Further, since the notification to the user is performed in response to the deterioration amount E having exceeded the threshold, even when the calibration is not automatically performed in response to the deterioration amount E having exceeded the threshold, it is possible to enable the user to perform an execution instruction operation for ventilation or calibration.

Note that the determination unit 46 has been described as causing the correction unit 43 and the notification unit 70 to perform calibration and notification, in response to the deterioration amount E having exceeded the threshold, but may also be configured to cause the correction unit and the notification unit to perform calibration and notification, in response to a period for which the deterioration amount E exceeds the threshold having passed over a standard period (also referred to as deterioration fixing period). In this case, it is possible to prevent unnecessary calibration or notification from being performed in response to variation in reversible and temporary circumstance. The deterioration fixing period may be a period in which it is considered that the measurement accuracy of the first measurement value is certainly deteriorated, or may be arbitrarily set from a standpoint of preventing erroneous detection of deterioration.

Figure 2:
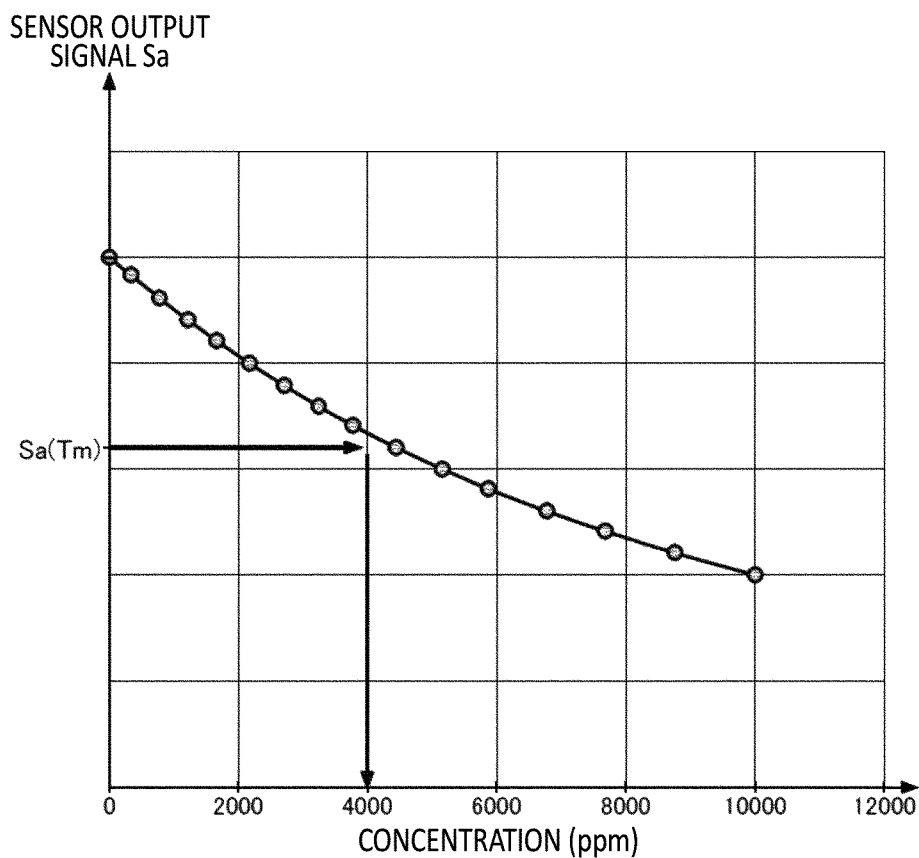
FIG. 2 illustrates an example of a method of calculating a concentration of gas to be detected by using calibration curve data.

FIG. 2 illustrates an example of a method of calculating a concentration of gas to be detected by using calibration curve data. The calibration curve data of the present example is data at a predetermined standard temperature (for example, 25° C.). A sensor output signal Sa on the vertical axis may be the light absorption signal Signal_Abs or the arrival light quantity signal Signal. The concentration measurement apparatus 100 can calculate the concentration of the gas to be detected included in the measurement target 110 by using common calibration curve data by generating the sensor output signal Sa(Tm) at the measurement temperature Tm.

Figure 3:
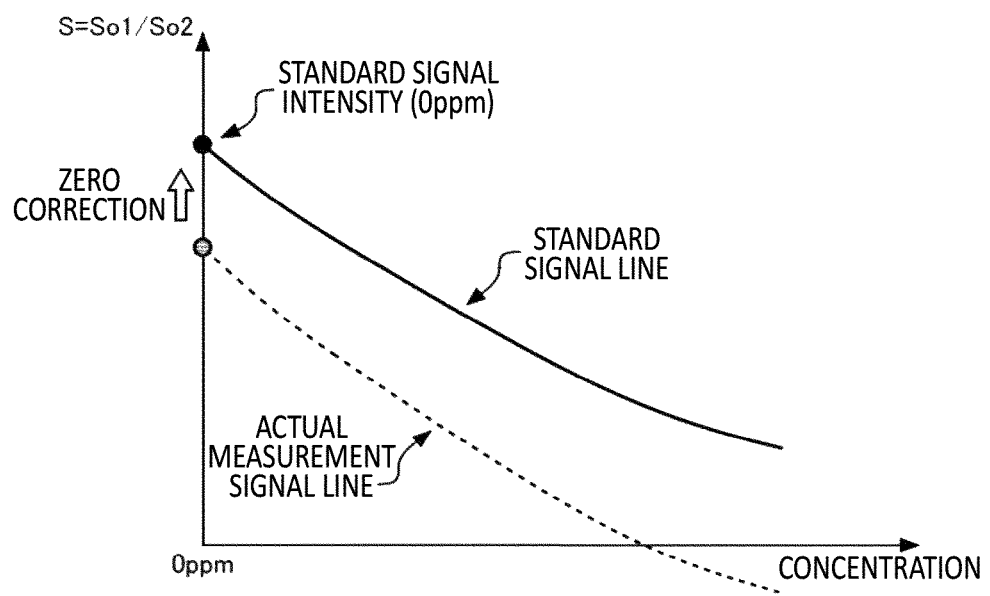
FIG. 3 illustrates a method of correcting a measurement error by zero correction.

FIG. 3 illustrates a method of correcting a measurement error by zero correction. A solid line is a standard signal line representing a concentration dependency of a measurement signal. A dashed line is an actual measurement signal line representing a concentration dependency of the measurement signal. For example, the actual measurement signal line is moved to perform correction such that an actual measurement signal intensity is to be matched to a standard signal intensity at a concentration of 0 ppm. In the present example, the actual measurement signal line of a signal intensity ratio S=So1/So2 is corrected, but a type of the signal to be corrected is not limited thereto.

Note that, in the present example, the actual measurement signal line is matched to the standard signal line by using the signal intensity at the concentration of 0 ppm of the gas to be detected. However, the correction may be performed using a concentration other than 0 ppm as a standard. For example, when the gas to be detected is carbon dioxide gas, the correction may be performed using the signal intensity at 400 ppm. The contents of the standard signal line may be set upon factory shipment.

Figure 4:
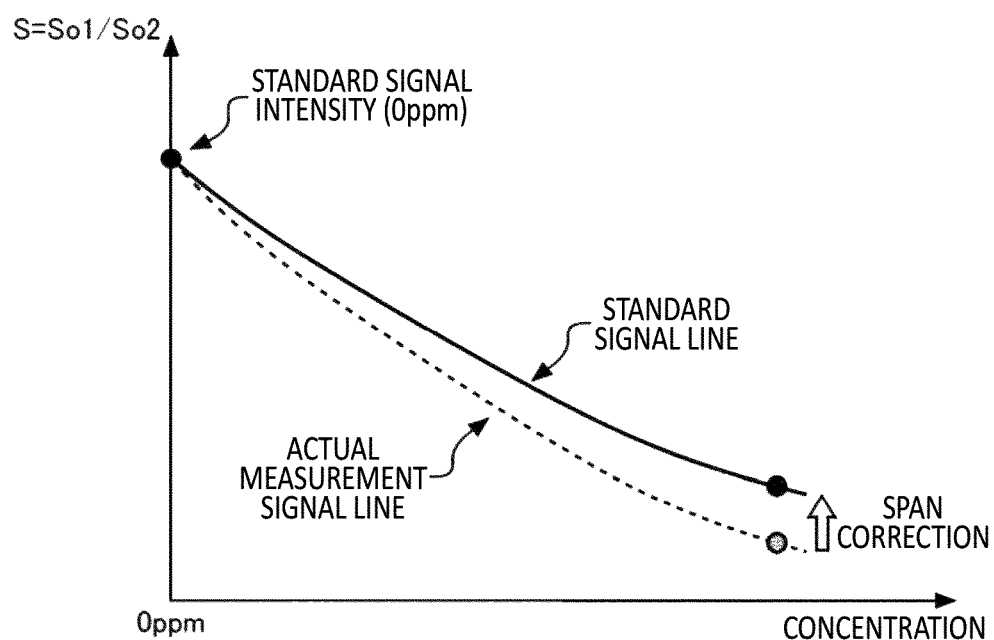
FIG. 4 illustrates a method of correcting a measurement error by span correction.

FIG. 4 illustrates a method of correcting a measurement error by span correction. In the span correction, a gradient of the actual measurement signal line represented by the dashed line is adjusted to perform correction such that a difference from the standard signal line within a measurement concentration range falls within a predetermined range. In the present example, the correction is performed such that variation in intensity of the actual measurement signal line within the measurement concentration range from a predetermined gas concentration (for example, 0 ppm) falls within a predetermined standard output range. The correction unit 43 may correct the temperature characteristics by using zero correction and span correction. The contents of the standard signal line may be set upon factory shipment.

Figure 5:
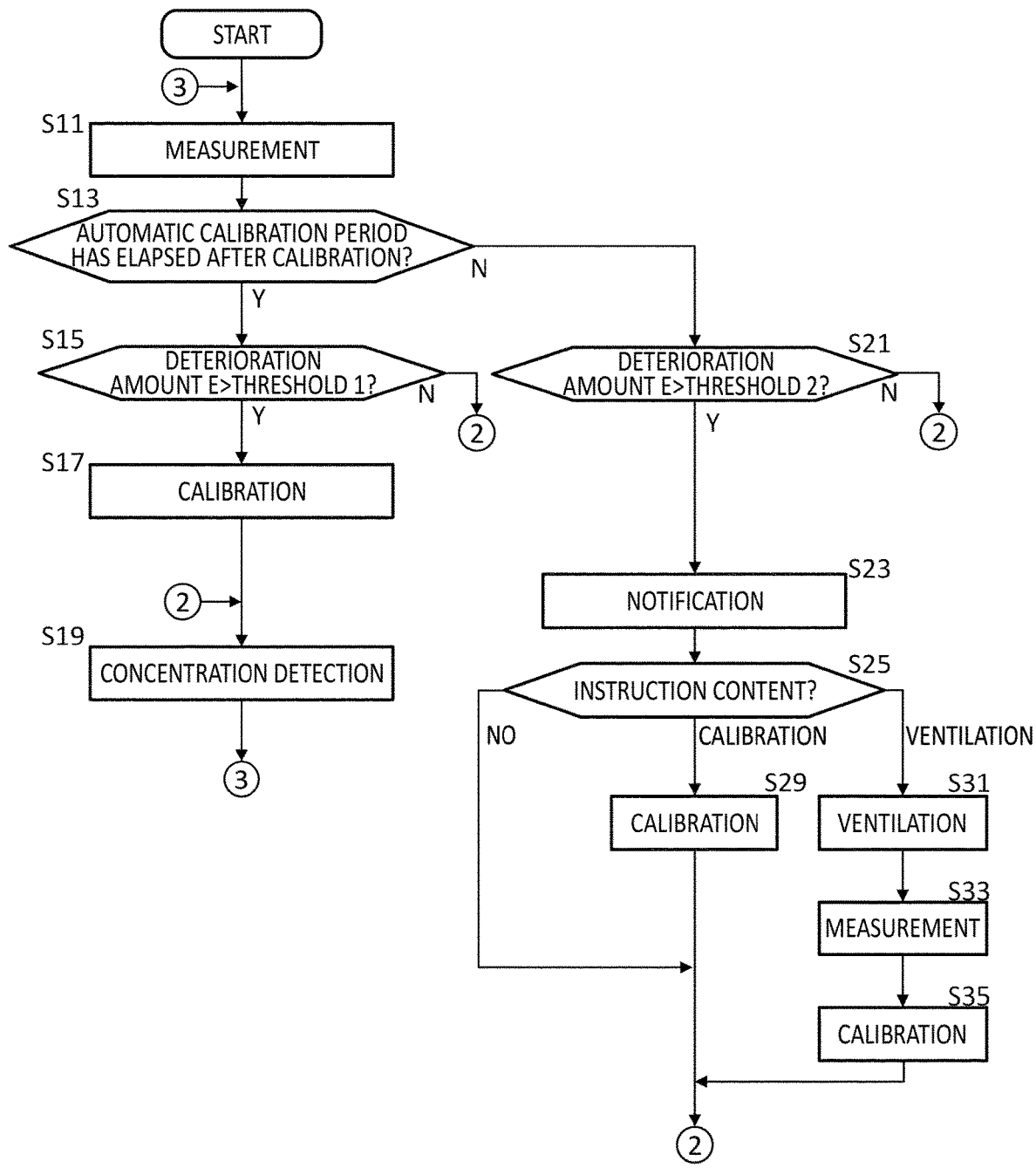
FIG. 5 illustrates an example of an operation flowchart of a concentration measurement apparatus 100.

FIG. 5 illustrates an example of an operation flowchart of the concentration measurement apparatus 100. The concentration measurement apparatus 100 detects a concentration of the gas to be detected while calibrating the first output signal So1 by processing of steps S11 to S35.

In step S11, the light-emitting unit 10 emits light, and the first detection unit 21, the second detection unit, and the temperature measuring unit 30 performs measurement. In the present embodiment, as an example, the first detection unit 21 measures the first measurement value and outputs the first output signal So1, the second detection unit 22 measures the second measurement value and outputs the second output signal Sot, and the temperature measuring unit 30 measures the measurement temperature T.

In step S13, the calculation unit 44 determines whether the standard time (also referred to as an automatic calibration period) has elapsed since the previous calibration by the correction unit 43. The automatic calibration period may be a period for which calibration may be performed automatically after the elapse thereof, or may be arbitrarily set. The automatic calibration period may be a period for which ventilation should be performed at least once after calibration. The automatic calibration period may be a period for which deterioration in accuracy of the first measurement value after calibration is suspected. The automatic calibration period may be a period shorter than the deterioration fixing period. Note that calibration by the correction unit 43 may be performed in steps S17, S29, S35 and the like described later.

When it is determined in step S13 that the automatic calibration period has not elapsed (step S13; No), the processing may proceed to step S21. When it is determined in step S13 that the automatic calibration period has elapsed (step S13; Yes), the processing may proceed to step S15.

In step S15, the determination unit 46 calculates the deterioration amount E, and determines whether the deterioration amount E has exceeded a threshold (also referred to as threshold 1 so as to be distinguished from a threshold that is used in step S21 described later). The threshold 1 may be an example of the first threshold value. When it is determined that the deterioration amount E has not exceeded the threshold 1 (step S15; No), the processing may proceed to step S19. When it is determined that the deterioration amount E has exceeded the threshold 1 (step S15; Yes), the determination unit 46 may output a calibration instruction signal and the processing may proceed to step S17.

In step S17, the correction unit 43 performs calibration of the first output signal So1. As an example, the correction unit 43 calculates the standard value SV' by using the measurement result by the first detection unit 21 at a time when the concentration of the gas to be detected was the lowest after the previous calibration, and decides the shift amount Δ between the predetermined standard value SV and the calculated standard value SV'. Instead of this, the correction unit 43 calculates the standard value SV' by using the measurement results by the first detection unit 21, the second detection unit 22 and the temperature measuring unit 30 at the time when the concentration of the gas to be detected was the lowest after the previous calibration, and decides the shift amount Δ from the predetermined standard value SV. Thereby, the first output signal So1 is calibrated, in response to the deterioration amount E having exceeded the threshold 1 after the automatic calibration period has elapsed from the previous calibration.

In step S19, the correction unit 43 corrects the first output signal So1 to generate a correction signal Sc, and the calculation unit 44 detects the concentration of the gas to be detected from the correction signal Sc.

The correction unit 43 may perform at least one of zero correction or span correction on the first output signal So1. In addition to or instead of this, the correction unit 43 may perform deterioration correction on the first output signal So1, i.e., addition and subtraction or multiplication and division of the shift amount Δ of the standard value SV on the first output signal So1. Thereby, a correction signal Sc is generated. In the present embodiment, as an example, the correction unit 43 performs zero correction and/or span correction and deterioration correction in this order, but may also perform deterioration correction first.

The calculation unit 44 may calculate the concentration of the gas to be detected corresponding to the correction signal Sc by using predetermined calibration curve data for calculating the concentration of the gas to be detected. The calculation unit 44 may cause the detected concentration to be displayed on a display device (not shown). In addition to this, the calculation unit 44 may cause the elapsed time from the previous calibration or the remaining time of the deterioration fixing period to be displayed. In addition, the calculation unit 44 may cause the lowest concentration of the gas to be detected, which was detected after the previous calibration, or the time at which the lowest concentration was detected to be further displayed. These display contents may be used as a determination material for the user to decide an operation content in step S25 described later. When the processing of step S19 ends, the processing may proceed to step S11 described above.

In step S21, the determination unit 46 calculates the deterioration amount E, and determines whether the deterioration amount E has exceeded a threshold (also referred to as a threshold 2 so as to be distinguished from the threshold 1 used in step S15 described above). The determination unit 46 may determine whether the deterioration amount E has exceeded the threshold continuously over the deterioration fixing period or longer. Here, the thresholds 1 and 2 may be the same or different. In the present embodiment, as an example, the threshold 1 that is used when the elapsed time after calibration has exceeded the automatic calibration period may be smaller than the threshold 2 that is used when the elapsed time after calibration has not exceeded the automatic calibration period. Thereby, the calibration condition in step S17 can be relaxed, and calibration can be actively performed. In addition, the threshold 1 may be set to fluctuate according to the elapsed time after calibration. For example, the threshold 1 may be set to be smaller as the elapsed time after calibration approaches the automatic calibration period. This makes it possible to positively perform calibration as the elapsed time after calibration becomes longer. In addition, the thresholds 1 and 2 may be set to be smaller as the concentration of the gas to be detected is higher. For example, for the thresholds 1 and 2, a value corresponding to an exponential function of the concentration of the gas to be detected may be divided from the thresholds 1 and 2. This makes it possible to allow a magnitude of the detection accuracy deterioration corresponding to the thresholds 1 and 2 to be tailored, without depending on the concentration of the gas to be detected, resulting in the more accurate calibration.

When it is determined in step S21 that the deterioration amount E has not exceeded the threshold 2 (step S21; No), the processing may proceed to step S19. When it is determined that the deterioration amount E has exceeded the threshold 2 (step S21; Yes), the processing may proceed to step S23.

In step S23, the notification unit 70 performs notification to the user. In the present embodiment, as an example, the notification unit 70 displays that the deterioration amount E has exceeded the threshold 2. The notification unit 70 may further display the effect that ventilation is recommended.

In step S25, the instruction unit 80 outputs an instruction signal corresponding to a user operation. When a calibration instruction operation is input (step S25; calibration), the instruction unit 80 may supply a calibration instruction signal to the correction unit 43 to instruct calibration, and the processing may proceed to step S29. When a ventilation instruction operation is input (step S25: ventilation), the instruction unit 80 may supply a ventilation instruction signal to the ventilation control unit 60 to instruct ventilation, and the processing may proceed to step S31. Ventilation is preferably instructed until the elapsed time after calibration passes over the automatic calibration period. When an operation is not performed (step S25: No), the processing may proceed to step S19 described above.

In step S29, the correction unit 43 performs calibration of the first output signal So1. The correction unit 43 may perform calibration, similarly to the processing in step S17. In the present embodiment, as an example, the correction unit 43 calculates the standard value SV' by using the measurement result by the first detection unit 21 at the time when the concentration of the gas to be detected was the lowest after the previous calibration, and decides the shift amount Δ between the predetermined standard value SV and the calculated standard value SV'. Instead of this, the correction unit 43 calculates the standard value SV' by using the measurement results by the first detection unit 21, the second detection unit 22 and the temperature measuring unit 30 at the time when the concentration of the gas to be detected was the lowest after the previous calibration, and decides the shift amount Δ from the predetermined standard value SV. When the processing of step S29 ends, the processing may proceed to step S19 described above.

In step S31, the ventilation control unit 60 causes the ventilator to perform ventilation of the gas of the measurement target 110. In step S33, the first detection unit 21, the second detection unit 22, and the temperature measuring unit 30 perform measurement. The first detection unit 21, the second detection unit 22, and the temperature measuring unit 30 may perform measurement, similarly to step S11. Then, in step S35, the correction unit 43 performs calibration of the first output signal So1. The correction unit 43 may perform calibration, in response to the ventilation information being acquired. The correction unit 43 calculates the standard value SV' by using the first output signal So1 acquired in step S33, and decides the shift amount Δ between the predetermined standard value SV and the calculated standard value SV'. Instead of this, the correction unit 43 calculates the standard value SV' by using the first output signal So1, the second output signal Sot and measurement temperature T acquired in step S33, and decides the shift amount Δ between the predetermined standard value SV and the calculated standard value SV'. When the processing of step S35 ends, the processing may proceed to step S19 described above.

According to the operation described above, since the first output signal So1 is calibrated, in response to determining that the deterioration amount E has exceeded the threshold, it is possible to prevent calibration from being automatically performed even though the deterioration in accuracy of the first measurement value after calibration is small. In addition, since the first output signal So1 is calibrated, in response to determining that the deterioration amount E has exceeded the threshold after the automatic calibration period has elapsed from the previous calibration, the calibration can be prevented from being frequently performed.

Further, when it is determined that the deterioration amount E has exceeded the threshold 2, the ventilation control unit 60 is instructed to perform ventilation of the gas of the measurement target 110 or the correction unit 43 is instructed to perform calibration, in response to a user operation. Therefore, the user can select the execution content.

Note that, in the above operation, it has been described that, when it is determined that the deterioration amount E has exceeded the threshold 2, ventilation or calibration is performed in response to the user operation performed in step S25. However, ventilation or calibration may be automatically performed, in response to determining that the deterioration amount E has exceeded the threshold 2. Also in this case, the ventilation information acquisition unit 47 may acquire the ventilation information and supply a calibration instruction signal to the correction unit 43. In addition, it has been described that the calibration of the first output signal So1 is performed, in response to the deterioration amount E having exceeded the threshold 1 after the automatic calibration period has elapsed from the previous calibration. However, in addition to this, the calibration of the first output signal So1 may be performed, in response to the deterioration amount E having exceeded a threshold (also referred to as threshold 3 so as to be distinguished from the thresholds 1 and 2 that are used in steps S15 and S21 described above) before a standard time (for example, the automatic calibration period) has elapsed from previous calibration. The threshold 3 may be an example of the second threshold value. The threshold 3 may be larger than the threshold 1, or may be the same as or different from the threshold 2. Thereby, when the deterioration amount E is large, the calibration can be performed even before an automatic calibration period elapses.

In addition, it has been described that the effect that it is determined that the deterioration amount E has exceeded the threshold 2 or that ventilation is recommended is displayed in the processing of step S23. However, another content may also be further displayed. For example, the notification unit 70 may cause a setting time of the deterioration fixing period or the automatic calibration period, and a setting value of the threshold of the deterioration amount E to be displayed. In this case, in the processing of step S25, the user may change the settings of the deterioration fixing period, the automatic calibration period, and the threshold, according to the measurement environment.

Further, during the above operation, the concentration measurement apparatus 100 may diagnose deterioration of the light-emitting unit 10, and may adjust an amount of current that is caused to flow through the light-emitting unit 10 when deterioration is detected. These processing may be performed before or after step S11. As a method for diagnosing deterioration or adjusting the amount of current, for example, a method disclosed in Japanese Patent Application Publication No.2020-160064 may be used.

Note that, in the above embodiment, the second physical quantity (i.e., a physical quantity independent of the concentration of the gas to be detected and having a correlation with the standard value SV among the physical quantities relating to the main measuring unit 1000) has been described as the intensity of the infrared ray having passed through the light transmission region 120 of the standard transmittance. However, in addition to this or instead of this, at least one other physical quantity is also possible. For example, the second physical quantity may be at least one of an intensity of the infrared ray having passed through the light transmission region 120 of the standard transmittance, a resistance value of the sensor part in the first detection unit 21, a resistance value of the sensor part in the second detection unit 22, and a supply voltage to the light-emitting unit 10. When any one of these physical quantities is used as the second physical quantity, the second detection unit 22 may be configured to output the second output signal So2 (also referred to as a second output signal $So2^{(1)}$) representing a value of the physical quantity. The determination unit 46 may be configured to set, as the deterioration amount E, a value of a function $G(So2^{(1)}, T)^{(1)} = So2_{(after\ detenoration)}^{(1)}/f(T)_{(1)}$ using a second output signal $So2^{(1)}$ and a function $f(T)^{(1)}$ that fluctuates depending on the measurement temperature. The function $f(T)^{(1)}$ may be a function that is the same as or different from f(T). On the other hand, when a plurality of physical quantities are each used as the second physical quantity, the second detection unit 22 may be configured to output the second output signal So2 (second output signal $So2^{(1)}, \ldots So2^{(N)}$) representing a value of each physical quantity (N: a natural number of 2 or greater)). The determination unit 46 may be configured to calculate a temporary deterioration amount $E'^{(n)}$ (n: a natural number of $1 \le n \le N$)) for each physical quantity as the second physical quantity, and to set the maximum value of the temporary deterioration amount $E'^{(n)}$ as the deterioration amount E. The temporary deterioration amount $E'^{(n)}$ may be a value of a function $G(So2^{(n)}, T)^{(n)} = So2_{(after\ detenoration)}^{(n)}/f(T)^{(n)}$ using the second output signal $So2^{(n)}$ and a function $f(T)^{(n)}$ that fluctuates depending on the measurement temperature T. The function $f(T)^{(n)}$ in each function $G(So2^{(n)}, T)^{(n)}$ may be a function different from another function $G(So2^{(n)}, T)^{(n)}$, or a function that is the same as at least some function $G(So2^{(n)}, T)^{(n)}$.

In addition, the third physical quantity (i.e., a physical quantity independent of the concentration of the gas to be detected and having a correlation with the standard value SV) has been described as the temperature of the measurement target 110 or the concentration measurement apparatus 100, but another physical quantity is also possible. For example, the third physical quantity may be a physical quantity different from the second physical quantity, among an intensity of the infrared ray emitted from the light-emitting unit 10 and having passed through the light transmission region 120 of the standard transmittance, a resistance value of the sensor part in the first detection unit 21, a resistance value of the sensor part in the second detection unit 22, a supply voltage to the light-emitting unit 10 and humidity of the gas of the measurement target 110. Note that the second physical quantity and the third physical quantity may be the same kind of a physical quantity at different measurement positions.

Further, the ventilation control unit 60 and the ventilator have been described as supplying the ventilation information to the ventilation information acquisition unit 47, in response to the end of ventilation, but may also be configured to supply the ventilation information to the determination unit 46, in response to ventilation being performed. In this case, the determination unit 46 may be configured to determine completion of the ventilation, in response to variation in the gas concentration calculated by the calculation unit 44 during the ventilation or variation in the first output signal value So1, and to supply a calibration instruction signal to the correction unit 43. As an example, the determination unit 46 may be configured to determine that the ventilation has been completed, in response to a calculation result of the gas concentration or a variation rate of the first output signal value So1 becoming lower than a standard variation rate. The determination unit 46 may be configured to end the ventilation operation by supplying a signal representing that the ventilation has been completed to at least one of the ventilator, the ventilation control unit 60, the notification unit 70, or the instruction unit 80. Thereby, it is possible to accurately determine the completion of ventilation and to end the ventilation operation.

Figure 6:
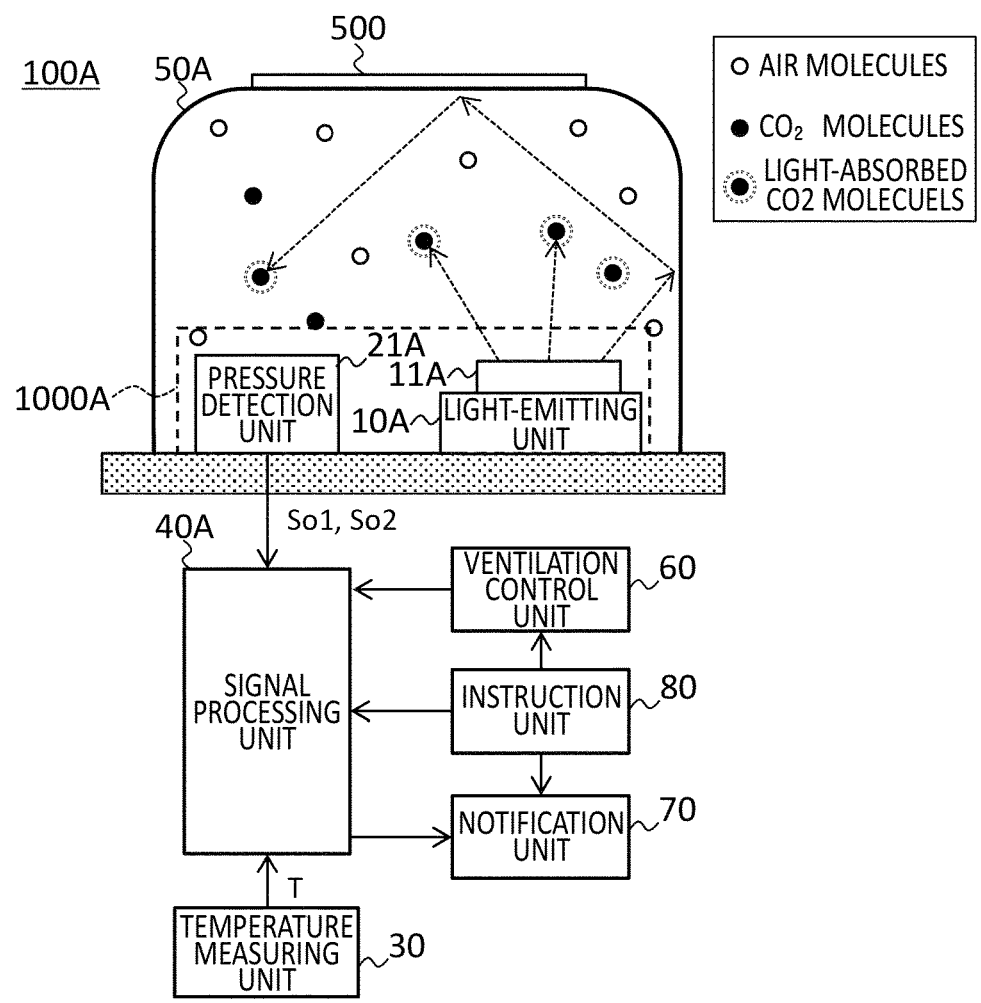
FIG. 6 illustrates a concentration measurement apparatus 100A according to a modified embodiment.

Subsequently, a concentration measurement apparatus 100A according to a modified embodiment will be described. FIG. 6 illustrates a concentration measurement apparatus 100A according to a modified embodiment. Note that, in the concentration measurement apparatus 100A according to the present embodiment, the configurations that are substantially the same as those of the concentration measurement apparatus 100 illustrated in FIG. 1 are denoted with the same reference signs and the descriptions thereof are omitted.

The concentration measurement apparatus 100A is configured to detect a concentration of gas to be detected by a so-called photoacoustic method, and includes a light-emitting unit 10A, a pressure detection unit 21A, and a signal processing unit 40A. Note that the light-emitting unit 10A and the pressure detection unit 21A may be arranged in a cell 50A in which the measurement target 110 is sealed. The measurement target 110 in the cell 50A may be ventilated through a dust filter 500.

The light-emitting unit 10A is configured to emit an infrared ray. The light-emitting unit 10A may be a MEMS device. An infrared ray filter 11A configured to transmit only infrared rays may be provided on an emission surface of the light-emitting unit 10A. The infrared ray emitted from the light-emitting unit 10A passes through the measurement target 110, is absorbed by molecules of the gas to be detected included in the measurement target 110 (in the present embodiment, carbon dioxide molecules, as an example), and vibrates the molecules. This increases a pressure in the cell 50A.

The pressure detection unit 21A is a sensor configured to measure the pressure in the cell 50A. The pressure detection unit 21A may be, for example, a piezoelectric type microphone.

The pressure detection unit 21A is an example of the first sensor, and is configured to measure a pressure of the measurement target 110 as the first physical quantity that varies in response to light emitted from the light-emitting unit 10A passing through the measurement target 110. The pressure detection unit 21A may be configured to supply the first output signal So1 representing a measurement value of the first physical quantity to the signal processing unit 40A. The pressure detection unit 21A may be configured to detect the presence or absence or concentration of the gas to be detected included in the measurement target 110 from an amount of increase in pressure due to the vibrating gas to be detected (carbon dioxide, as an example). Note that the pressure detection unit 21A and the light-emitting unit 10A may constitute a measuring unit (also referred to as a main measuring unit or a main measurement apparatus) 1000A configured to mainly measure a concentration of gas included in the measurement target. The main measuring unit 1000A may include other components such as an infrared ray filter 11A.

The pressure detection unit 21A may be an example of the second sensor, and is configured to measure, among the physical quantities relating to the main measuring unit 1000A, a pressure of the measurement target 110 when the infrared ray from the light-emitting unit 10A does not pass therethrough, as the second physical quantity independent of the concentration of the gas to be detected included in the measurement target 110 and having a correlation with the standard value SV of the first measurement value. The pressure detection unit 21A may be configured to supply the second output signal So2 representing a measurement value of the second physical quantity to the signal processing unit 40A.

The signal processing unit 40A may have a configuration similar to that of the signal processing unit 40 in the concentration measurement apparatus 100 described above, except that the first output signal So1 and the second output signal So2 are acquired from the pressure detection unit 21A.

According to the concentration measurement apparatus 100A described above, also in the photoacoustic type concentration measurement apparatus 100A, the effects similar to those of the concentration measurement apparatus 100 of the above embodiment can be obtained.

Note that, in the above modified embodiment, the second physical quantity (i.e., a physical quantity independent of the concentration of the gas to be detected and having a correlation with the standard value SV, among the physical quantities relating to the main measuring unit 1000A) has been described as the pressure of the measurement target 110 when the infrared ray from the light-emitting unit 10A does not pass therethrough. However, in addition to this or instead of this, at least one other physical quantity is also possible. For example, the second physical quantity may be at least one of a pressure of the measurement target 110 when the infrared ray from the light-emitting unit 10A has not passed therethrough, a pressure in a light transmission space when the infrared ray emitted from the light-emitting unit 10A has passed through the light transmission space of the standard transmittance, a resistance value of the sensor part in the pressure detection unit 21A, a resistance value of a sensor configured to measure the pressure in the light transmission space described above, or a supply voltage to the light-emitting unit 10A. The light transmission space may include a closed space isolated from the measurement target 110 or may include a light-transmitting member such as glass.

In addition, the third physical quantity (i.e., a physical quantity independent of the concentration of the gas to be detected and having a correlation with the standard value SV) has been described as the temperature of the measurement target 110 or the concentration measurement apparatus 100A, similarly to the embodiment, but another physical quantity is also possible. For example, the third physical quantity may be a physical quantity different from the second physical quantity, among a pressure of the measurement target 110 when the infrared ray of light from the light-emitting unit 10A has not passed therethrough, a pressure in a light transmission space when the infrared ray emitted from the light-emitting unit 10A has passed through the light transmission space of the standard transmittance, a resistance value of the sensor part in the pressure detection unit 21A, a resistance value of a sensor configured to measure the pressure in the light transmission space described above, a supply voltage to the light-emitting unit 10A, temperature of the measurement target 110 or the concentration measurement apparatus 100A, humidity of gas of the measurement target 110 and an atmospheric pressure in a surrounding environment of the concentration measurement apparatus 100A.

Note that, in the above embodiment and modified example, the concentration measurement apparatus 100, 100A has been described as including the ventilation control unit 60, the notification unit 70, and the instruction unit 80, but may not include any one of them.

In addition, it has been described that the first output signal So1 is calibrated, i.e., the shift amount Δ of the standard value SV of the first output signal So1 is decided using the sensor that is used for determination of the deterioration in accuracy of the first output signal So1 or for zero correction of the first output signal So1. However, the first output signal So1 may be calibrated using a sensor configured to measure a separate physical quantity from the sensor that is used for determination of the deterioration in accuracy or for zero correction.

Further, the light-emitting units 10 and 10A have been described as emitting infrared rays, but may also be configured to emit light of other wavelengths as long as the light is band light in an absorption band of the gas to be detected.

Further, the calculation unit 44 has been described as causing the detection result of the concentration of the gas to be detected to be displayed, but may also be configured to cause other information to be further displayed. For example, the calculation unit 44 may be configured to cause a message recommending replacement or maintenance of the concentration measurement apparatus 100, 100A to be displayed, in response to the fact that an interval of calibration performed in the processing of steps S17, S29 and S35 is shorter than a standard interval (2 days, as an example). Further, the calculation unit 44 may be configured to estimate a timing at which calibration is to be performed next in the processing of steps S17, S29, and S35, from the interval of calibration performed in the processing of steps S17, S29, and S35 so far, and to cause the timing to be displayed. Further, the calculation unit 44 may be configured to cause a message suggesting replacement or maintenance of the concentration measurement apparatus 100, 100A to be displayed, in response to the fact that an interval from this calibration to the estimated timing of the next calibration is shorter than a standard interval.

Further, it has been described that the concentration of the gas to be detected is measured by the single concentration measurement apparatus 100, but the concentration of the gas to be detected may be measured by a plurality of concentration measurement apparatuses 100. In this case, the calculation unit 44 of at least one concentration measurement apparatus 100 may be configured to decide the concentration of the gas to be detected, based on the deterioration amount E of each concentration measurement apparatus 100. As an example, the calculation unit 44 may be configured to set a concentration measured by the concentration measurement apparatus 100 having the lowest deterioration amount E among the plurality of concentration measurement apparatuses 100, as a correct concentration of the gas to be detected, or to set a concentration measured by any one concentration measurement apparatus 100 decided from the deterioration amount E and a cumulative use time of the concentration measurement apparatus 100 among the plurality of concentration measurement apparatuses 100, as a correct concentration of the gas to be detected. In this case, in response to the deterioration amount E of any one concentration measurement apparatus 100 among the plurality of concentration measurement apparatuses 100 having exceeded the threshold, the correction unit 43 of the concentration measurement apparatus 100 (also referred to as the concentration measurement apparatus 100(1)) may be configured to perform calibration by using, as a standard, another concentration measurement apparatus 100 (also referred to as the concentration measurement apparatus 100(2)) having measured a concentration set as a correct concentration. For example, the correction unit 43 of the concentration measurement apparatus 100(1) may be configured to set, as a calibration result in the concentration measurement apparatus 100(1), a value corresponding to the shift amount Δ of the standard value SV' of the concentration measurement apparatus 100(1) to the standard value SV' of the concentration measurement apparatus 100(2). Similarly, the concentration of the gas to be detected may be measured by a plurality of concentration measurement apparatuses 100A.

Further, the calculation unit 44 has been described as detecting the concentration of the gas to be detected, but may also be configured to detect the presence or absence of the gas to be detected. As an example, the calculation unit 44 may be configured to detect the presence or absence of the gas to be detected at a standard concentration or higher by using a concentration of the gas to be detected in the air as a standard concentration.

While the present invention has been described above by using the embodiments, the technical scope of the present invention is not limited to the scope of the claims according to the above-described embodiments. It is apparent to persons skilled in the art that various alterations or improvements can be added to the above-described embodiments. It is also apparent from the description of the claims that the embodiment to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: light-emitting unit
11: infrared ray filter
12: optical path part
14: reflecting part
20: infrared ray detection unit
21: first detection unit
22: second detection unit
30: temperature measuring unit
40: signal processing unit
41: signal value acquisition unit
42: temperature information acquisition unit
43: correction unit
44: calculation unit
45: storage unit
46: determination unit
47: ventilation information acquisition unit 50: casing
60: ventilation control unit
70: notification unit
80: instruction unit
100: concentration measurement apparatus
110: measurement target
120: light transmission region
1000: measuring unit.

What is claimed is:

1. A method comprising:
measuring, by a measuring unit including a light-emitting unit and a first sensor configured to measure a first measurement value of a first physical quantity that varies in response to light emitted from the light-emitting unit passing through a measurement target, the first measurement value;
measuring, by a second sensor, among physical quantities relating to the measuring unit, a second measurement value of a second physical quantity independent of a concentration of gas to be detected included in the measurement target and having a correlation with a standard value of the first measurement value;
measuring, by a third sensor, a third measurement value of a third physical quantity having a correlation with the standard value independent of the concentration of the gas to be detected included in the measurement target;
detecting presence or absence of the gas to be detected or the concentration of the gas to be detected included in the measurement target, based on the first measurement value;
determining whether a deterioration amount of accuracy of the first measurement value has exceeded a threshold by using the second measurement value and the third measurement value; and
performing calibration of the first measurement value, in response to the deterioration amount having exceeded the threshold, wherein
performing the calibration includes specifying the standard value by using a plurality of first measurement values including the first measurement value, and performing the calibration of the first measurement value based on the standard value specified by using the plurality of first measurement values.

2. The method according to claim 1, wherein
determining whether the deterioration amount of the accuracy of the first measurement value has exceeded the threshold includes calculating, as the deterioration amount of the accuracy of the first measurement value, a value of a function defined by the second measurement value and the third measurement value, the value of the function becoming a predetermined value when the accuracy of the first measurement value has not deteriorated.

3. The method according to claim 1, wherein
the calibration of the first measurement value is performed, in response to the deterioration amount having exceeded a first threshold value after a standard time has elapsed from previous calibration.

4. The method according to claim 3, wherein
the calibration of the first measurement value is performed, in response to the deterioration amount having exceeded a second threshold value larger than the first threshold value before the standard time has elapsed from the previous calibration.

5. The method according to claim 1, wherein
the calibration is performed, in response to receiving a calibration instruction operation from a user.

6. The method according to claim 1, wherein further comprising:
acquiring ventilation information representing that the measurement target has been ventilated,
the calibration is performed, in response to the ventilation information being acquired.

7. The method according to claim 6, further comprising:
causing a ventilator of the measurement target to perform ventilation, wherein
acquiring the ventilation information includes acquiring the ventilation information from the ventilator.

8. The method according to claim 1, wherein
the calibration is performed by using measurement results by the second sensor and the third sensor.

9. The method according to claim 1, further comprising:
performing notification to a user, in response to the deterioration amount having exceeded the threshold.

10. The method according to claim 9, further comprising:
causing a ventilator of the measurement target to perform ventilation or causing the calibration to be performed, in response to a user operation when the notification is issued.

11. The method according to claim 1, wherein
the measuring unit is configured to emit an infrared ray from the light-emitting unit and to measure an intensity of the infrared ray having passed through the measurement target by the first sensor.

12. The method according to claim 11, wherein
the second physical quantity is at least one of:
an intensity of an infrared ray emitted from the light-emitting unit and having passed through a light transmission region of a standard transmittance,
a resistance value of the first sensor,
a resistance value of a sensor configured to measure the intensity of the infrared ray having passed through the light transmission region, or
a supply voltage to the light-emitting unit.

13. The method according to claim 11, wherein
the third physical quantity is a physical quantity different from the second physical quantity, among
an intensity of an infrared ray emitted from the light-emitting unit and having passed through a light transmission region of a standard transmittance,
a resistance value of the first sensor,
a resistance value of a sensor configured to measure the intensity of the infrared ray emitted from the light-emitting unit and having passed through a light transmission region of a standard transmittance,
a supply voltage to the light-emitting unit, temperature of the measurement target, and humidity of the measurement target when the measurement target is gas.

14. The method according to claim 1, wherein
the measuring unit is configured to emit an infrared ray from the light-emitting unit and to measure a pressure of the measurement target through which the infrared ray has passed by the first sensor.

15. The method according to claim 1, further comprising:
outputting a detection result indicating the presence or the absence or the concentration of the gas to be detected included in the measurement target.

* * * * *